UNITED STATES PATENT OFFICE.

JACOB GOODALE LIPMAN, OF NEW BRUNSWICK, NEW JERSEY.

SULFUR COMPOSITION.

1,361,596.   Specification of Letters Patent.   Patented Dec. 7, 1920.

No Drawing.   Application filed April 10, 1920. Serial No. 372,961.

*To all whom it may concern:*

Be it known that I, JACOB G. LIPMAN, a citizen of the United States, residing at New Brunswick, in the county of Middlesex and State of New Jersey, have invented certain new and useful Improvements in Sulfur Composition, of which the following is a full, clear, and exact description.

This invention relates to compositions of matter and has for one of its principal objects to provide a composition of matter consisting of or containing sulfur inoculated with sulfofying bacteria in a latent or potentially active condition.

Sulfur oxidizing bacteria, which may be referred to as sulfofying bacteria, are the active biological agents in the transformation of elementary sulfur into sulfuric acid. The transformation takes place under suitable environmental conditions where either pure or crude cultures of sulfofying bacteria are employed.

The sulfuric acid produced by sulfofying bacteria under suitable environmental conditions may be concentrated and used as such in the arts and industries. It may also be employed in agriculture for promoting in various ways the growth of plants.

Some of the more important uses and results attained by use of sulfofying bacteria in agriculture may be enumerated as follows: When added to soil together with sufficient quantities of finely divided sulfur they will, through the sulfuric acid produced by them, suppress the activities of injurious fungi, noxious parasites, insects and weeds. Moreover, when employed in this manner they transform sodium carbonate and bicarbonate into sodium sulfate and thus constitute an effective means for reclaiming black alkali soil.

By adding them to soil crops are assured a more adequate supply of sulfates and the yields thereby increased. Other and important advantages might be enumerated but to avoid surplusage specific mention thereof is omitted.

In accordance with my invention I provide a composition of matter containing sulfur and sulfofying bacteria in a latent or potentially active condition. The compound may be stored almost indefinitely, but is at all times immediately available and may be readily rendered active in the manner hereinafter more specifically described.

While various methods or processes of preparing the composition may be employed, I prefer at present to employ the following method. A culture of sulfofying bacteria may be obtained by mixing the following constituents in about the following proportions:

Sulfur_____ 100 pounds,
Phosphate rock_____ 300 pounds,
Sulfate of iron_____ 0.4 pound,
Sulfate of aluminum_____ 0.4 pound,
Fertile soil_____ 1600 pounds.

This mixture is preferably kept at a temperature between 70° and 90° Fahrenheit and so moist as to be about one-half saturated. The mixture should be stirred daily or at suitable intervals for from six to ten weeks when the sulfofying bacteria will have developed.

The mixture or culture thus formed is then dried and mixed with ground sulfur either before, during or after, but preferably during, the grinding of the latter. The proportions of sulfofying bacteria culture and sulfur which I find at present most desirable are as follows:

Sulfur_____ 95 to 99.5 parts,
Sulfofying bacteria culture_ 5 to 0.5 parts.

The previously dried sulfofying bacteria when intimately mixed with the dry finely divided sulfur retain their viability almost indefinitely. The composition is latent or potentially active and may be rendered active at will by suitably changing its environmental or other conditions. For example, when the composition of sulfur and latent sulfofying bacteria is placed in moist soil the bacteria become active and cause the oxidation of sulfur to sulfuric acid.

As above stated, other methods may be employed in preparing my novel composition of matter. For example, the culture of sulfofying bacteria may be grown in a liquid medium which may then be sprinkled on sulfur, dried and if desired mixed with additional dry sulfur. Furthermore, the composition may be modified as desired by the addition of other ingredients some of which are disclosed as follows:

For use in connection with some soils, mixtures of pulverized gypsum and pulverized sulfur may be employed instead of sulfur alone. For this purpose I have devised a composition consisting of the following ingredients in preferably the following proportions:

| | |
|---|---|
| Dry pulverized gypsum | 65 to 79 parts, |
| Dry pulverized sulfur | 34.5 to 20.5 parts, |
| Sulfofying bacteria culture | 0.5 to 5 parts. |

While I prefer at present to employ these proportions, they may be varied as to the relative amounts of gypsum and sulfur, but not in any large degree as to the relative amounts of sulfofying bacteria culture.

Soils which are liable to become excessively acid on account of the repeated applications of sulfur, or of sulfur mixed with other materials, would give better results with mixtures of gypsum, sulfur, carbonate of lime and sulfofying bacteria culture preferably in the following proportions:

| | |
|---|---|
| Dry pulverized gypsum | 35 to 69 parts, |
| Dry pulverized carbonate of lime | 30 to 10 parts, |
| Dry pulverized sulfur | 34.5 to 20.5 parts, |
| Sulfofying bacteria culture | 0.5 to 5 parts. |

For soils deficient in nitrogen and organic matter, dry, finely divided peat may be used together with dry, finely divided sulfur and sulfofying bacteria culture preferably in the following proportions:

| | |
|---|---|
| Dry finely divided peat | 25 to 50 parts, |
| Dry finely divided sulfur | 74.5 to 49.5 parts, |
| Sulfofying bacteria culture | 0.5 to 5 parts. |

For soils deficient in potash, dry glauconitic marl or other potash carrying material may be used together with dry finely divided sulfur and a sulfofying bacteria culture preferably in the following proportions:

| | |
|---|---|
| Dry glauconitic marl or other finely divided potash-carrying material | 50 to 75 parts, |
| Dry finely divided sulfur | 49.5 to 24.5 parts, |
| Sulfofying bacteria culture | 0.5 to 5 parts. |

In employing the term "latent" I mean "potentially active." In other words, the bacteria in my novel composition are normally inactive for as long a period as desired and may be readily and quickly rendered active as above described.

What I claim is:—

1. A composition of matter containing sulfur and latent sulfofying bacteria in a dry condition.

2. A composition of matter containing dry pulverized sulfur and a dry culture of sulfofying bacteria.

3. A composition of matter containing 0.5 to 5 per cent. of latent sulfofying bacteria culture and finely divided sulfur.

4. A composition of matter containing 0.5 to 5 parts of latent sulfofying bacteria culture and 95 to 99.5 parts of finely divided sulfur.

In testimony whereof I hereto affix my signature.

JACOB GOODALE LIPMAN.